D. BALDWIN.
Motor for Light Machinery.

No. 159,063. Patented Jan. 26, 1875.

WITNESSES:

INVENTOR:
D. Baldwin
BY
ATTORNEYS.

UNITED STATES PATENT OFFICE.

DAVID BALDWIN, OF MIDLAND PARK, NEW JERSEY.

IMPROVEMENT IN MOTORS FOR LIGHT MACHINERY.

Specification forming part of Letters Patent No. 159,063, dated January 26, 1875; application filed October 24, 1874.

*To all whom it may concern:*

Be it known that I, DAVID BALDWIN, of Midland Park, Bergen county, New Jersey, have invented a new and Improved Sewing-Machine Stool, of which the following is a specification:

The invention will first be fully described, and then pointed out in the claim.

Figure 1:
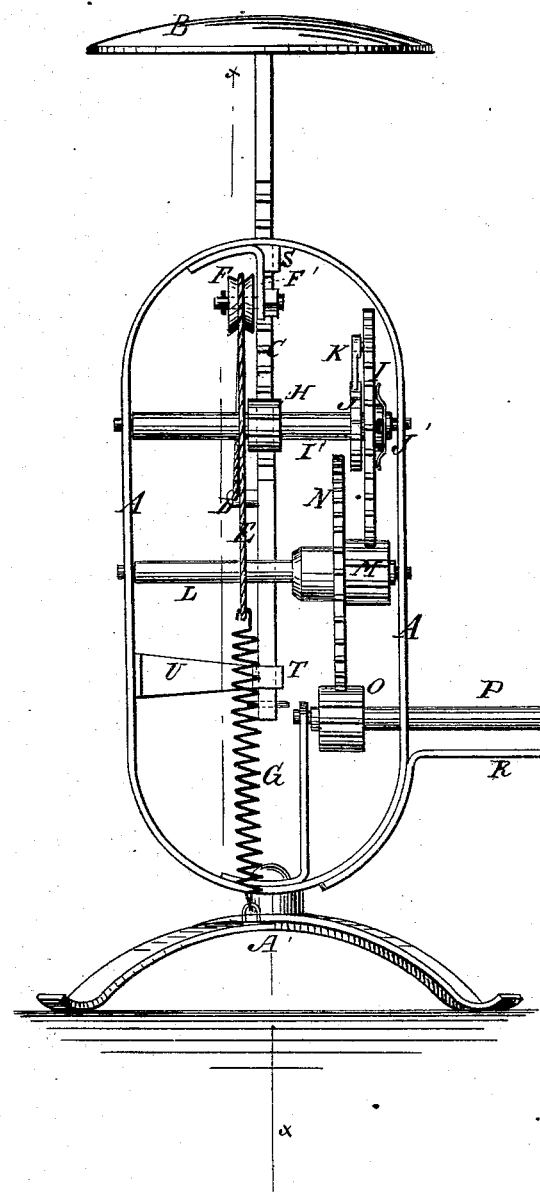
Figure 2:
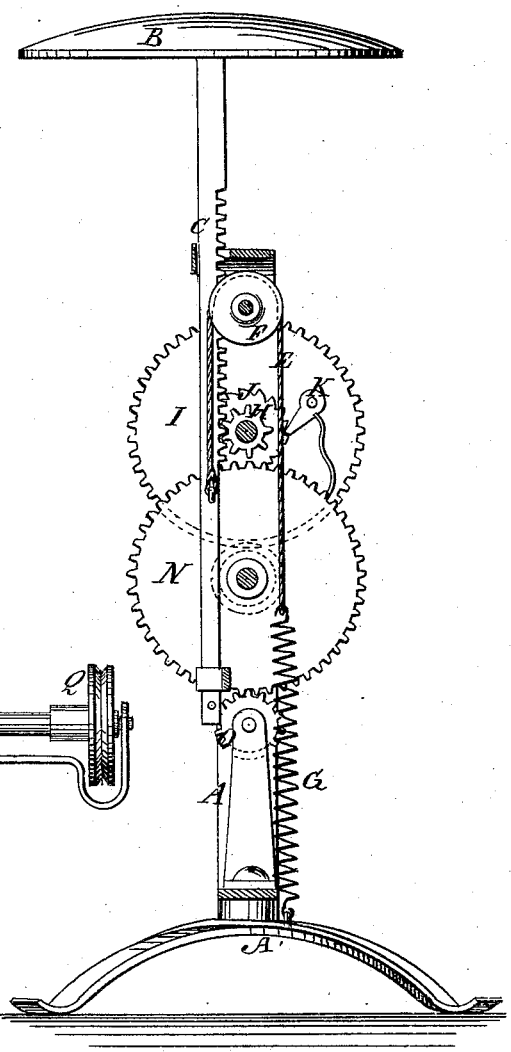

In the drawing, Figure 1 is a side elevation of the machine; and Fig. 2 is a vertical section of Fig. 1, taken through the line *x x*.

Similar letters of reference indicate corresponding parts.

A is the frame, of oval or other form, rigidly attached to the stand A'. B is the seat on which the operator sits, and whose weight gives a downward movement to the rack C, to which rack the seat is attached. D is a pin in the side of the rack, and E is a cord attached to the pin D, which cord passes up and over the pulley F, which pulley is supported from the frame A by means of the hanger F'. G is a spiral spring, which is attached to the other end of the cord E and to the stand A'. The rack C is made to engage with the pinion H. I is a gear-wheel fitted loosely on the pinion-shaft I'. J is a ratchet-wheel made fast on the pinion-shaft, and in contact with the center of the gear-wheel I. J' is a spring, the arms of which bear on the wheel I to force it against the ratchet that it may be held stationary during the back motion. The wheel I engages with the pinion M on the shaft L. N is a gear-wheel on the shaft L, which meshes into the pinion O of the shaft P. This shaft P extends out laterally from the frame. In its outer end is the wheel Q, from which motion is imparted to the sewing-machine or other machine driven. The outer end of this shaft P is supported by the bracket R from the frame A. The motive power is supplied by the down motion of the seat. The back or upward motion is given by the spring G. The wheel I remains at rest when the seat ascends, being held by the friction caused by the spring J'. This spring is slipped loosely onto the shaft, and is held by a pin, and bears the wheel against the ratchet with sufficient force to hold it stationary and allow the pawl to slip over the teeth of the ratchet-wheel during the upward motion of the seat. The rack C is confined in a guide, S, of the hanger F' at the upper end of the frame. At the lower it is confined by the guide T of the arm U, which arm is attached to the frame A, as seen in the drawing. The momentum of the parts, acquired during the down motion of the rack, will give the cord-wheel Q a constant motion in one direction, and adapts the apparatus for driving sewing-machines and other light machinery. This machine is, in fact, a stool or seat, on which the operator sits and gives the rack the reciprocating motion instead of using his feet, the reciprocating motion being converted to a rotary motion, as described.

Having thus described my invention, I claim as new and desire to secure by Letters Patent—

The combination with shaft I', having loose spur-wheel I, spring-held side pawl K, fast ratchet J, spring J', and pinion H, of the seat rack-bar C, pulley F, cord E, and spring G, all arranged in connection with frame A, as shown and described, for the purpose of operating the drive mechanism of the sewing-machine.

DAVID BALDWIN.

Witnesses:
T. B. MOSHER,
ALEX. F. ROBERTS.